(12) United States Patent
Peric et al.

(10) Patent No.: US 11,468,545 B1
(45) Date of Patent: Oct. 11, 2022

(54) SYSTEMS AND METHODS FOR MOTION MEASUREMENT DRIFT CORRECTION

(71) Applicant: BioMech Sensor, LLC, Midlothian, VA (US)

(72) Inventors: Igor Peric, Barcelona (ES); Dusko Mirkovic, Bijeljina (BA); Alexander Maslennikov, North Potomac, MD (US)

(73) Assignee: BioMech Sensor, LLC, Midlothian, VA (US)

( * ) Notice: Subject to any disclaimer, the term of this patent is extended or adjusted under 35 U.S.C. 154(b) by 0 days.

(21) Appl. No.: 17/659,594

(22) Filed: Apr. 18, 2022

(51) Int. Cl.
| G06T 5/00 | (2006.01) |
| G06T 7/246 | (2017.01) |
| G06V 10/34 | (2022.01) |
| G06V 10/82 | (2022.01) |
| G06V 10/80 | (2022.01) |
| G06V 10/62 | (2022.01) |

(52) U.S. Cl.
CPC .............. *G06T 5/006* (2013.01); *G06T 7/246* (2017.01); *G06V 10/34* (2022.01); *G06V 10/62* (2022.01); *G06V 10/811* (2022.01); *G06V 10/82* (2022.01)

(58) Field of Classification Search
USPC ........................................ 382/103, 155, 275
See application file for complete search history.

(56) References Cited

U.S. PATENT DOCUMENTS

| 9,967,463 | B2* | 5/2018 | Mourikis | ............ | H04N 5/23258 |
| 10,306,206 | B2* | 5/2019 | Mourikis | .................. | G06T 7/73 |
| 10,371,539 | B2* | 8/2019 | Broyles | .................... | H04W 4/02 |
| 10,670,404 | B2* | 6/2020 | Roumeliotis | .......... | G01C 21/16 |
| 10,722,165 | B1* | 7/2020 | Douglas | ................ | A61B 5/6825 |
| 10,773,123 | B1* | 9/2020 | Douglas | ............. | A63B 24/0006 |
| 11,341,412 | B1* | 5/2022 | Fornari | ................ | G06K 9/6263 |
| 2016/0165140 | A1 | 6/2016 | Mourikis et al. | | |
| 2020/0300633 | A1* | 9/2020 | Roumeliotis | .......... | G01C 21/16 |

(Continued)

FOREIGN PATENT DOCUMENTS

| CN | 104658012 B | 4/2017 |
| EP | 2 386 828 B1 | 11/2011 |
| WO | WO 2008/068542 A1 | 6/2008 |

OTHER PUBLICATIONS

Nyqvist et al., A High Performance Tracking System based on Camera and IMU, 2013, 16th International Conference on Information Fusion, Istanbul, Turkey, Jul. 9-12, 2013, pp. 1-8 (Year: 2013).*

(Continued)

*Primary Examiner* — Ishrat I Sherali
(74) *Attorney, Agent, or Firm* — Finnegan, Henderson, Farabow, Garrett & Dunner LLP

(57) ABSTRACT

This disclosure relates to systems, media, and methods for mitigating measurement drift and improving IMU odometry measurement. In an embodiment, the system may perform operations including receiving first sensor data from at least one motion sensor; receiving 3-dimensional (3-D) motion data based on motion detected by at least one camera; inputting model input data into a machine learning model configured to generate at least one vector, the model input data being based on the received first sensor data and the received 3-D motion data; and apply the at least one vector as an offset.

20 Claims, 7 Drawing Sheets

(56) References Cited

U.S. PATENT DOCUMENTS

2021/0140990 A1* 5/2021 German .............. G06T 5/006
2021/0401324 A1* 12/2021 Liao .............. G06V 40/23
2022/0107184 A1* 4/2022 Omr .............. G01C 21/3602

OTHER PUBLICATIONS

Liu et al. SLAM for Robotic Navigation Fusing RGB-D and Inertial Data in Recurrent and Convolutional Neural Networks, 2019 978-1-7281-2223-6, pp. 1-6. (Year: 2019).*
Yan et al., "RIDI: Robust IMU Double Integration," arXiv:1712.090042v2 [cs.CV] Dec. 31, 2017 (9 pages).
Yan et al., RoNIN: Robust neutral Inertial Navigation in the Wild: Benchmark, Evaluations, and New Methods, arXiv:1905.128t3v1 [cs.CV] May 30, 2019 (14 pages).

* cited by examiner

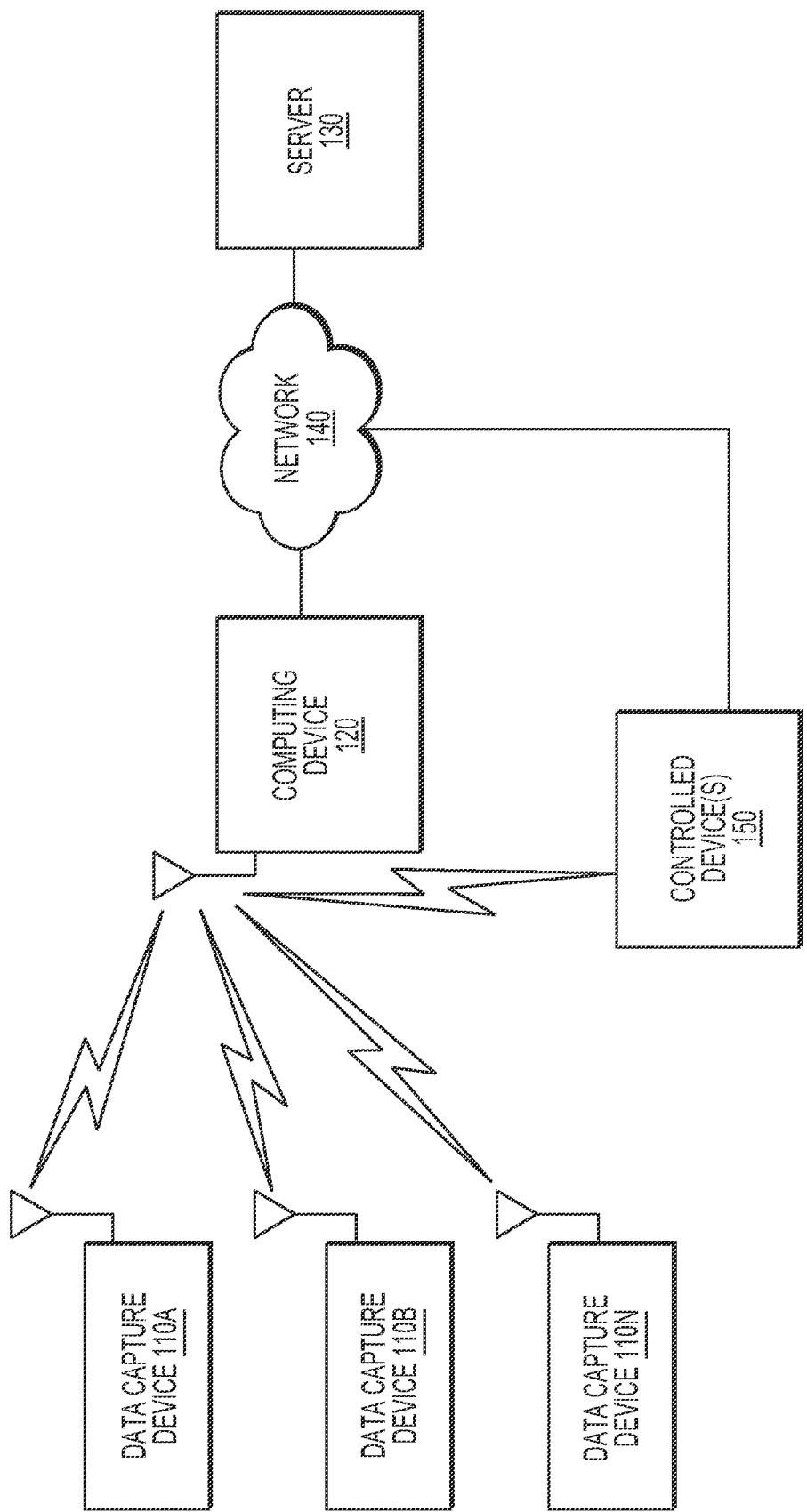

SYSTEMS AND METHODS FOR MOTION MEASUREMENT DRIFT CORRECTION

TECHNICAL FIELD

This disclosure relates generally to data acquisition and analysis, and more particularly to methods and systems for motion data quantification, acquisition, analysis, and refinement.

BACKGROUND

In current contexts, some devices or systems may sense and record human motion, such as in the sports or medicine industries. For example, a sensor device may sense motion and may record data values representing the sensed motion, such as the individual's gait. Existing motion data gathering techniques often acquire data that suffers from drift, where recorded motion data values shift from true motion data values over time, presenting inaccurate data. In some cases, certain environments, such as those with vibrations caused by individuals in neighboring rooms, may further complicate drift problems. In many cases, motion data may be gathered from a single device with limited self-correction abilities. Inaccurate data can in turn lead to a number of additional problems, including misdiagnosis of health issues, low quality physical therapy, or improper physical technique training. The embodiments discussed herein address one or more of these and other problems in the art.

SUMMARY

Disclosed embodiments may include methods, systems, devices, and non-transitory computer-readable media to mitigate measurement drift improve location measurement, and improve inertial odometry measurement. Disclosed embodiments may include a device comprising a memory storing instructions and at least one processor configured to execute the instructions. The at least one processor may be configured to execute the instructions to: receive first sensor data from at least one motion sensor; receive 3-D motion data based on motion detected by at least one camera; input model input data into a machine learning model configured to generate at least one vector, the model input data being based on the received first sensor data and the received 3-D motion data; and apply the at least one vector as an offset to at least one of: the received first sensor data, to create offset first sensor data; or second sensor data received from the at least one motion sensor, to create offset second sensor data.

In further embodiments, the model input data may comprise at least one of: a value representing absolute orientation in space; a value representing a measurement of a gravitational force; a value representing angular velocity; or a value representing linear acceleration.

In further embodiments, the machine learning model may be a neural network. In further embodiments, the neural network may comprise at least one of: a convolution layer; a linear layer; a soft maximum filter; a drop-out layer; or a batch normalization layer. In further embodiments, the neural network may comprise a one-dimensional layer.

In further embodiments, the at least one vector may comprise at least two values, each value corresponding to a different coordinate direction.

In further embodiments, the at least one motion sensor may comprise an inertial measurement unit (IMU); and the received first sensor data may comprise position data of the IMU.

In further embodiments, the device may comprise the at least one camera.

In further embodiments, the at least one motion sensor may comprise an inertial measurement unit (IMU); and the IMU may be communicably coupled to the computer-implemented device.

In further embodiments, the first sensor data and the 3-D motion data may be generated while the at least one motion sensor or the at least one camera is in contact with a user.

In further embodiments, the at least one processor may be configured to execute an instruction to apply a data transformation to the received first sensor data to generate at least a portion of the model input data. In further embodiments, the data transformation may comprise at least one of: a data smoothing operation; a moving average operation; or a coordinate frame transformation.

In further embodiments, the first sensor data and the second sensor data may comprise time series datasets, and the at least one processor may be configured to execute an instruction to use at least one of the offset first sensor data or the offset second sensor data to adjust a visual representation of one of the time series datasets. In further embodiments, the at least one processor may be configured to execute an instruction to cause the display of the adjusted visual representation.

In further embodiments, the machine learning model may be trained to generate the at least one vector, and the training may be based on model input data sourced with at least one particular contextual attribute. In further embodiments, the at least one processor may be configured to execute an instruction to select the machine learning model from among a plurality of machine learning models associated with respective contextual attributes. In further embodiments, the at least one processor may be configured to execute an instruction to select the machine learning model based on at least one input received at the computer-implemented device from a user.

In further embodiments, the at least one processor may be configured to execute an instruction to train the machine learning model using the received first sensor data and the received 3-D motion data.

An embodiment may include a device comprising a memory storing instructions and at least one processor configured to execute the instructions. The at least one processor may be configured to execute the instructions to: receive a first data stream of time-series sensor data from at least one motion sensor; receive a second data stream of time-series 3-dimensional (3-D) motion data based on motion detected by at least one camera; input model input data into a machine learning model configured to generate at least one vector, the model input data comprising vectors representing at least one of angular velocity or linear acceleration, the vectors being based on the first data stream and the second data stream; and apply the at least one vector as an offset to at least one of the first data stream or the second data stream.

It is to be understood that both the foregoing general description and the following detailed description are exemplary and explanatory only and are not restrictive of the invention, as claimed. Additionally, the various disclosed embodiments may be used together in different combinations.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1A illustrates an exemplary motion data acquisition, analysis, and feedback system according to some embodiments of the present disclosure.

DETAILED DESCRIPTION

Figure 1B:
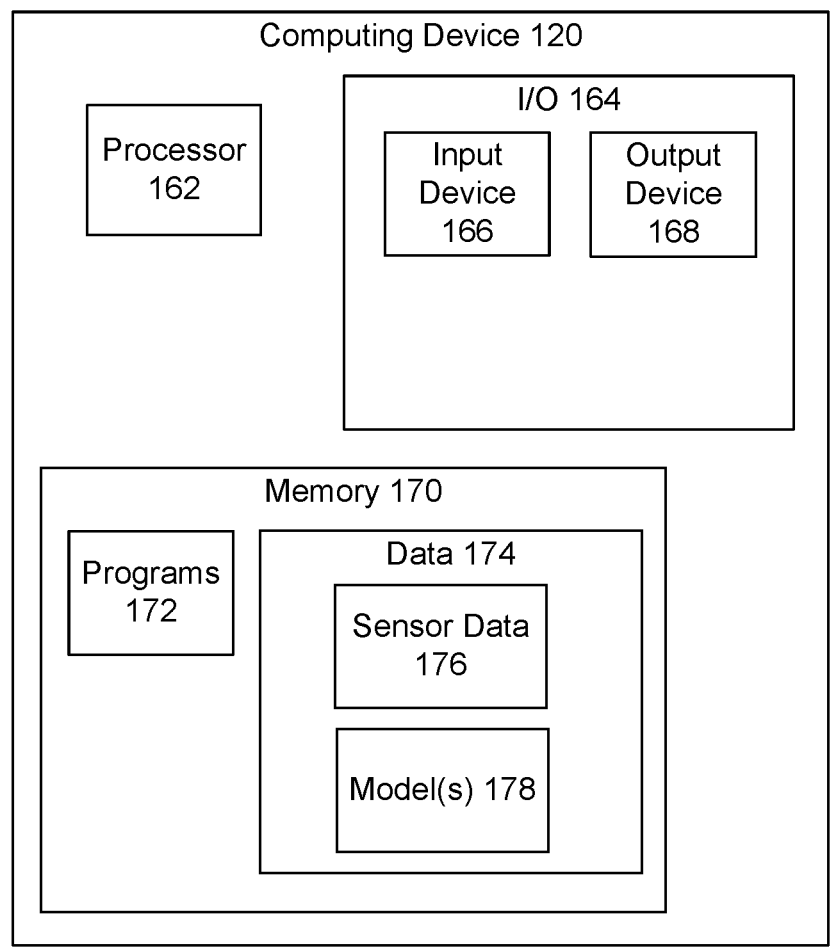
FIG. 1B is a functional block diagram of a computing device according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

FIG. 1A illustrates an exemplary real-time data quantification, acquisition, analysis, and system 100 according to some embodiments of the present disclosure. System 100 may include one or more data capture devices (110A, 110B, 110N), computing device 120, controlled device(s) 150, network 140, and server 130.

System 100 may include one or more sensor devices to aggregate sensor data. Data capture devices 110A, 110B, and 110N represent the one or more sensor devices that provide data to system 100. Each of the shown data capture devices may include the same sensor capabilities or different capabilities. For example, data capture device 110A may include an inertial measurement unit (IMU), while data capture device 110B provides pressure data (e.g., from the grip of a hand, from an insole, from a pushing motion). Data capture device 110B may also be a camera or other electromagnetic wave-sensing device. In a differing example, the entire sensor shown could only include IMUs, but could be located on different people, or on different points of a single person (e.g., wrist, knee, ankle, back, neck). In some embodiments, a data capture device 110A may be a wearable device (e.g., wearable on an individual). In some embodiments, a data capture device may capture data not directly associated with an individual, such as machine motion, natural motion (e.g., tidal motion), motion of an animal, or motion of any other entity that may be detected by an IMU, camera, or other sensor. Sensors may provide various sensed data to system 100 as further discussed below.

System 100 may include computing device 120. In some embodiments, computing device 120 may be a general-purpose computer, tablet device, smartphone, or smart watch. Computing device 120 may include a processor, memory (e.g., random-access memory, called RAM, flash memory, and/or a hard disc), various wired and wireless interfaces (e.g., Bluetooth®, IEEE 802.11, Ethernet, Universal Serial Bus (USB), USB-C, and/or proprietary ports such as Apple Lightning), input devices (e.g., touchscreen, keyboard, mouse), and a display. Computing device 120 may operate programmable instructions stored locally or remotely to perform disclosed processes.

Computing device 120 may interact with one or more sensor devices. Computing device 120 may receive sensor data from data capture device 110A, data capture device 110B, and/or data capture device 110N. For example, data capture device 110A may send, in real time, data perceived from sensors. Sensor data may be high-resolution data, and the connection between data capture device 110A and computing device 120 may be a high bandwidth connection, such as a Bluetooth® "classic" wireless connection. While such high-bandwidth wireless technologies may use more power than alternatives (e.g., Bluetooth® "low energy"), the increased data resolution that may be used by system 100 may use higher bandwidth wireless interfaces. Computing device 120 may be associated with a particular user (e.g., a user device).

System 100 may include controlled device(s) 150 that perform functions based on received instructions. For example, controlled device(s) 150 may include output devices, such as remote displays, lights, speakers, and tactile engines that may provide feedback (e.g., information regarding one or more detected events) to a user of data capture device 110A. These types of controlled devices may provide feedback (e.g., a status indicator) to a user based on sensor data, such as informing the user that a sensor device is providing a data profile that meets expectations (e.g., is within an expected envelope of a reference profile) by displaying a green light, playing a positive tone, or tapping the user via a worn tactile engine. Other devices, such as computing device 120, may also provide feedback. Other feedback may include providing to a user: a percent match between a provided data profile and a reference data profile (e.g., representing ideal motion), an alert when motion (or other attribute) deviates from a reference envelope, and/or text recommendations regarding the user's motion (e.g. "consider angling your wrist differently to stabilize your motion"). By way of example and not limitation, a data profile may be generated for an individual prior to a medical operation, which may be treated as a reference data to compare to motion (or other attribute) sensed from the individual after the medical operation. In some embodiments, feedback may be presented to an individual within a user interface. For example, a user interface may display an ideal "baseline" of sensor data (e.g., motion) and may display sensed data (e.g., motion of the individual) relative to the baseline, such as in a line graph, timeline, histogram, or other visual representation. Feedback may be related to a motion data profile and/or non-motion data profile (e.g., temperature data profile, respiration data profile, etc.). Similar feedback operations may also be performed by other devices (e.g., computing device 120). Of course, in situations where non-human motion is sensed, corresponding feedback may be generated and/or displayed (e.g., a recommendation to recalibrate or fix a machine, or a recommendation to re-position an object).

In some embodiments, computing device 120 and/or data capture device 110A may issue a prompt to an individual related to a wearable device. For example, computing device 120 may prompt (e.g., on a display, audibly, etc.) for a user to confirm that a wearable device is connected to the user (e.g., "is the bracelet attached to your wrist?"), to activate power to a wearable device, to connect a wearable device (e.g., via Bluetooth® or other wireless communication protocol), etc. In some embodiments, a sensor device may not sense motion (or another attribute) if a user has not confirmed that the device is connected to an individual (or otherwise appropriately placed to capture relevant data, such as within an area for sensing light, connected to a machine, etc.). In some embodiments, computing device 120 and/or data capture device 110A, for example, may issue a prompt that data drift has been detected, a prompt indicating an option for correcting data drift, a prompt that data drift has been mitigated, and/or a prompt that at least one motion and/or location measurement has been determined.

In another example, controlled device(s) 150 may include devices that affect a user's workout environment. For example, controlled device(s) may include a fan, air conditioning system, or workout equipment. In this example, computing device 120 may transmit instructions to increase a fan speed, close shades to block sunlight, and/or instruct an air conditioner responsive to determining that the data capture device 110A indicates that a user's body temperature exceeds a healthy threshold level.

In still other examples, controlled device(s) 150 may include medical devices, such as insulin pumps, pacemakers, cardiac defibrillators, gastric stimulators, deep brain neurostimulators, and/or cochlear implants. In one example, computing device 120 may transmit a control signal to an insulin pump to vary insulin dosage based on data from data capture device 110A indicating higher levels of activity (e.g., a data profile matching an event model for intensifying activity). In another example, computing device 120 may transmit a control signal to a medication pump to provide medication to prevent or greatly lessen Parkinsonian tremors.

In still other examples, controlled device(s) 150 may include electrical and/or mechanical devices, such as parts of a vehicle (e.g., non-autonomous, partially autonomous, fully autonomous, etc.), assembly line, factory, a refrigerator, a freezer, lights, etc. In another example, computing device 120 may transmit a control signal to a piece of assembly line machinery to pause operation. In another example, computing device 120 may recalibrate and/or restart another device.

System 100 may include network 140. In some embodiments, network 140 may be a wired and/or wireless network. For example, network 140 may be any combination of a Local Area Network (LAN), Wide Area Network (WAN), wireless LAN (WLAN), and/or the Internet. System 100 may use network 140 to connect various devices. For example, computing device 120 may connect to server 130, controlled device(s) 150, and/or data capture device 110A using the network. Alternatively, as depicted, computing device 120 may interface directly with data capture device 110A and/or controlled device(s) 150. For example, computing device 120 may form its own wireless access point to connect to other devices. A connection may include a wired connection (e.g., copper wire, coaxial wire, Universal Serial Bus wire, fiber optic wire) or a wireless connection, such as a Bluetooth® connection, a cellular data connection, a near-field connectivity (NFC) connection, WiFi connection, radio wave connection, or other another type of connection allowing for communication between electronic devices.

System 100 may include server 130 to provide networked storage and analysis. Server 130 may be a networked computer. Server 130 may include a central processing unit, such as at least one data processor that executes program components for executing user- or system-generated requests. The processor may include specialized processing units or a general-purpose microprocessor. As discussed herein, server 130 may include any combination of elements included in computing device 120.

Server 130 may facilitate network-based (e.g., "cloud") storage and data interaction. For example, computing device 120 may transmit refined and/or raw data to server 130 for storage and/or analysis, such as model training or updating. In an embodiment, server 130 may analyze motion data over time and generate a model, update a model, validate a model, and/or suggest a use of, or a change to, a model, consistent with disclosed embodiments. Server 130 may transmit notifications (e.g., send email, upload data, revise websites, update databases, send a model) based on analysis of data.

In some embodiments, server 130 may serve as a portal to allow users to interact with archived data and models. For example, server 130 may provide a graphical user interface that presents data profiles organized by particular categories, dates, or types. Additionally, or alternatively, server 130 may provide a graphical user interface having a visual depiction (e.g., a multidimensional graph or animation) of motion data.

Server 130 may be associated with managing generation, updating, and/or validation of data drift offset models. For example, server 130 may include a program 172 that produces one or more interfaces to display, and allow for user interaction with, data related to motion models (e.g., sensor data, model parameters, experiment parameters, drift offset parameters, device calibration settings, etc.). By way of further example, server 130 may receive data, manipulate data, model data, display data, or perform any step of the processes described herein. In some embodiments, a server 130 and a controlled device 150 may be the same device. Additionally, or alternatively, server 130 and computing device 120 may be the same device.

FIG. 1B is a functional block diagram of computing device 120 according to some embodiments of the present disclosure. While several components are discussed with respect to exemplary computing device 120, it is fully appreciated that data capture device 110A, server 130, controlled device 150, or any other device connected to system 100 may also include any or all of the components discussed with respect to computing device 120. For example, server 130 may include one or more models 178.

Computing device 120 may include a processor 162, which may be a single-core or multi-core processor. Processor 162 may also be a general-purpose processor, a specialized processor, programmable microcontroller, programmable processor (e.g., a complex programmable logic device (CPLD) or a field-programmable gate array (FPGA)), or an application specific integrated circuit (ASIC). In some embodiments processor 162 may be a virtual processor and/or configured to spin up or spin down a number of virtual computing instances (e.g., containers, virtual machines) to perform one or more operations discussed herein. Processor 162 may be at least one data processor that executes program components for executing user-generated and/or system-generated requests. Processor 162 may include specialized processing units or a general-purpose microprocessor. Processor 162 may be configured to carry out all or part of process 500 and/or process 600 (not depicted in FIG. 1B).

Computing device 120 may also include input/output (I/O) 164, which may be an interface or grouping of one or more input devices 166 and one or more output device 168. Input device 166 may be configured to receive input from a user of computing device 120, and one or more components of computing device 120 may perform one or more functions in response to input received. In some embodiments, input device 166 may include a touchscreen, a keyboard, a microphone, a speaker, a haptic device, a camera, a light sensor, a button, a dial, a switch, a knob, a touch pad, a button, a microphone, a location sensor, an accelerometer, a camera, a fingerprint scanner, a retinal scanner, a biometric input device, an ultrasonic scanner, a transceiver (e.g., for sending and/or receiving Bluetooth® signals, cellular signals, radio signals, wireless signals), an input device, an output device, or other input device to perform aspects of the disclosed embodiments. For example, computing device 120 may include a camera (e.g., an input device 166), which may capture image data, which may be used in disclosed embodiments (e.g., to derive motion capture data). Additionally, or alternatively, input device 166 may include an interface displayed on a touchscreen (e.g., output device 168). Output device 168 may be configured to output information and/or data to the user. For example, output device 168 may include a display configured to display sensor or motion model data (e.g., a light-emitting diode (LED) display, a liquid crystal display (LCD) display, etc.).

Computing device 120 may also include a memory 170, which may store instructions for various components of server 130. For example, memory 170 may store instructions that, when executed by processor 162, may be configured to cause processor 162 to perform one or more functions described herein (e.g., steps of process 500, depicted in FIG. 5, and/or process 600, depicted in FIG. 6). Memory 170 may be a RAM memory component, flash memory, solid-state drive, hard disk, or other data storage medium. Memory 170 may store program(s) 172, which may be one or more programs, modules, applications, modules, or other computer code configured to carry out one or more operations described herein (e.g., steps of process 500 and/or process 600). For example, memory 170 may store a program 172 that may be configured to generate, train, update, operate, and/or validate a model, consistent with disclosed embodiments. Memory 170 may also store data 174, which may include data received from a sensor device and/or data generated (e.g., by processor 162) in response to an input received at computing device 120. For example, data 174 may include any combination of sensor data 176 (e.g., motion data, IMU data, camera data, motion capture data), a user preference, a user input, a model parameter, an experiment parameter, a training parameter, contextual data, metadata, and/or model(s) 178. By way of further example, data 174 may include data captured from one or more IMUs and/or may include data captured from one or more cameras (e.g., motion capture data, which may be captured by an augmented reality-equipped device).

Model(s) 178 may be one or more drift offset models and/or motion models, which may be trained or untrained. In some embodiments, a trained model may be trained through supervised training, unsupervised training, or a combination of both. A model may be a stochastic model or a deterministic model. In some embodiments, a trained model may be trained using input data, which may include sensor data (e.g., received from a data capture device 110A) and/or user inputs (e.g., an identification of a type of motion, an identification of a motion capturing device, identification of an environment condition, identification of a specification of a data capturing sensor or device). In some embodiments, a model 178 may be a k-nearest neighbors (KNN) model, a recurrent neural network (RNN), a convolutional neural network (CNN), an autoencoder, and/or other machine learning model. In some embodiments, a model 178 may perform one-dimensional operations with regularization techniques, such as batch normalization and drop-out. A model 178 may include one or more layers (e.g., neural network layers), discussed further herein. In some embodiments, a model 178 may be configured to only accept data in a particular format as an input. By way of example and without limitation, a model 178 may only accept sensor data that includes triaxial data values, or data described in a particular coordinate system.

In some embodiments, a model 178 may be configured for (e.g., have particularized parameters for, such through training with particular types of input data) a type of motion, such as motion from a particular body part or combination of body parts (arm motion, leg motion, hand motion, foot motion, joint motion, compound motion), motion from a particular action (e.g., walking, swinging, physical therapy activity), motion for a particular individual (e.g., a child, an adult, a college athlete, a professional athlete), motion from a particular object or configuration (e.g., a vehicle, a wind turbine, a tidal turbine, a robot, a machine, or any other object producing detectable motion), motion from a particular combination of sensors and parameters associated therewith (e.g., a number of sensors, a placement of a sensor, a type of sensor, sensors worn on multiple body parts, sensors worn on multiple individuals, different types of sensors worn by the same individual, an image sensor, a number of megapixels or other specification associated with an image sensor, an IMU, an accelerometer, a firmware version), and/or an environment condition (e.g., a parameter describing an aspect of an environment in which data is captured, such as an identification of an open space, an identification of a closed space, a room size, a room dimension, or a number of individuals in a room). For example, a model may represent a computerized (e.g., machine-learning) framework for interpreting one or more motion patterns (e.g., patterns of IMU data and/or patterns of motion capture data) and may be configured to generate one or more motion offsets (e.g., values, vectors, matrices) in response. In some embodiments, a model 178 may be configured for a particular type of data that may not include IMU data or motion capture data, such as temperature data, light data (for visible and/or invisible light), sound data, pressure data, magnetism data, humidity data, radiation data, heartbeat data, blood oxygen data, respiration data, brain wave data, etc. A model 178 may have been trained using data from a particular source (e.g., an individual, a location, a building, a company, a business, a hospital, a clinic, etc.). In some embodiments, a model 178 or other part of data 174 may include one or more sensor data profiles, which may represent recorded, offset, expected, or ideal data (e.g., a recorded data stream from a sensor device). A sensor data profile may include a waveform, histogram, value, matrix, vector, statistical value, threshold value, any measured or calculated value, and/or any combination thereof. For example, a motion sensor data profile may include three-dimensional acceleration data, three-axis orientation data, three-axis angular velocity data, and/or three-axis gravitational information over time. A sensor data profile may include, and/or may be based on, historical data from one or more sensor devices (e.g., one or more IMU sensors and/or cameras). In some embodiments, a sensor data profile may be generated by a model. Alternatively, a sensor data profile may be based on sensor data determined by a sensor device, and the sensor data profile may input to a model (e.g., for model training, updating, and/or validation). A sensor data profile may also be based on user input (e.g., data annotations), statistical techniques (e.g., a simple moving average, exponential smoothing, an autoregressive integration moving average, Croston method algorithm, etc.), random data, etc.

Figure 2:
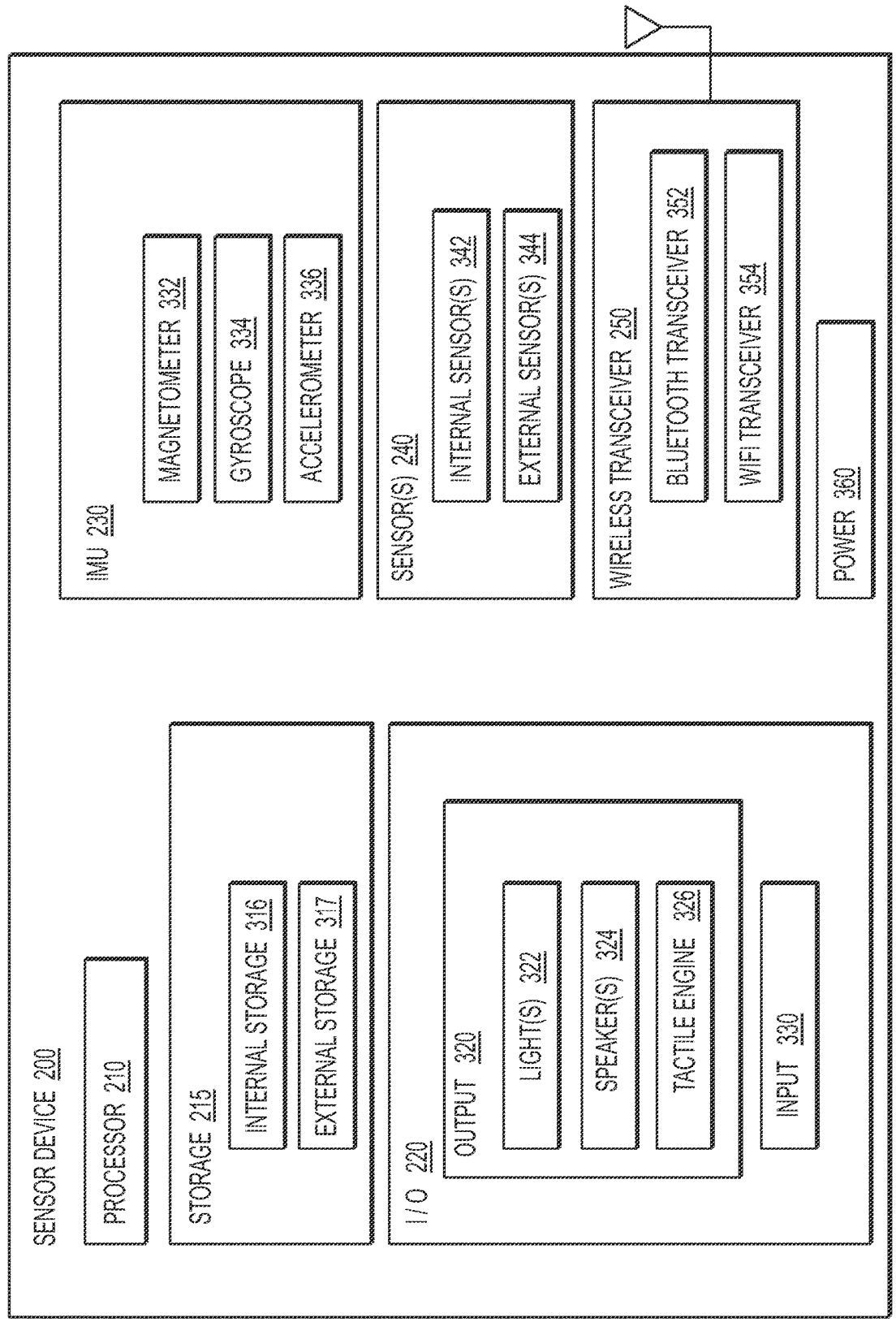
FIG. 2 is a functional block diagram of a sensor device according to some embodiments of the present disclosure.

FIG. 2 is a functional block diagram of sensor device 200 according to some embodiments of the present disclosure. Sensor device 200 may be an example of data capture device 110A, consistent with disclosed embodiments. Sensor device 200 may include processor 210, storage 215, input-output 220, IMU (inertial measurement unit) 230, sensor(s) 240, wireless transceiver 250, and/or power 360. In some embodiments, sensor device 200 may be a wearable device.

In some embodiments, processor 210 may be a general-purpose processor, programmable microcontroller, programmable processor (e.g., an FPGA, a CPLD), or ASIC.

In some embodiments, storage 215 may include internal storage 316 and/or external storage 317. Internal storage 316 may include, for example, on-board memory, such as flash memory or RAM. External storage may include, for example, removable memory media, such as compact flash cards, secure digital cards, memory sticks, optical disks, and the like. In some embodiments, storage 215 may include non-transitory computer-readable media that stores instructions that, when executed by a process (e.g., processor 210), cause the processor to perform disclosed functions and processes.

Input-output 220 may include output 320 and input 330. In some embodiments, output 320 may include lights 322 (e.g., on or more LEDs, an LCD display, a laser, a projector), speaker(s) 324 (e.g., a piezoelectric speaker, a buzzer, a siren, a loudspeaker), and tactile engine 326 (e.g., vibrators, haptic feedback mechanisms). Lights 322 may include lights on various surfaces and different angles of sensor device 200.

Input 330 may allow a user to activate and interact with sensor device 200. In some embodiments, input 330 may include a physical input mechanism (e.g., button, switch, capacitive interface) or a way to receive input (e.g., an infrared receiver, an optical receiver, a USB or serial port). Physical input mechanisms, for example, may allow the user to turn sensor device 200 on and off, synchronize with a computing device, and/or change modes.

Figure 3B:
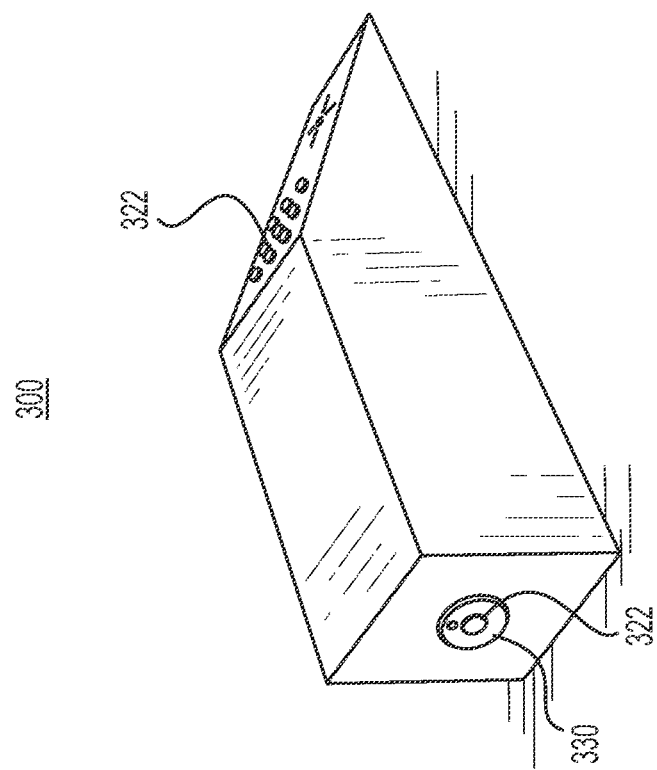
FIGS. 3A and 3B illustrate views of a sensor device in accordance with some embodiments of the present disclosure.
Figure 3A:
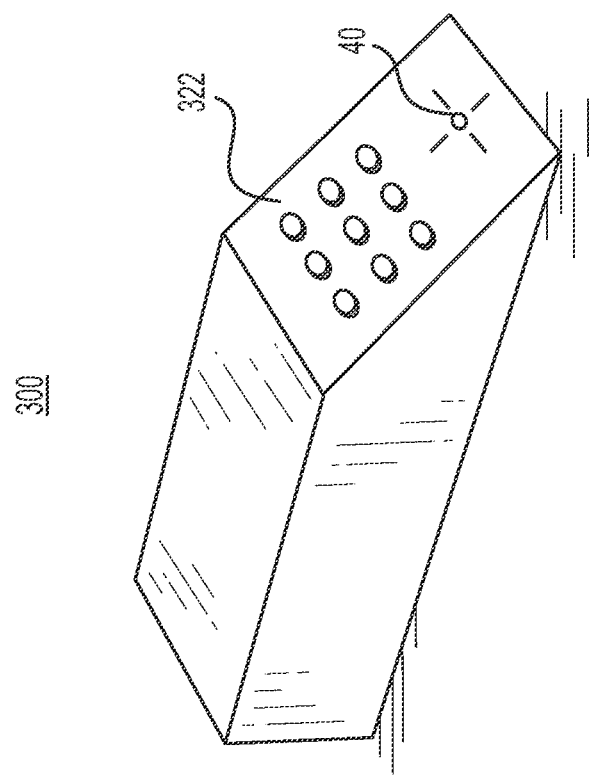

As an example of types of arrangements of output 320 and input 330, FIGS. 3A and 3B illustrate views of sensor device 300, which may be an instance of a data capture device 110N and/or sensor device 200, consistent with some embodiments of the present disclosure. In some embodiments, sensor device 300 may be a wearable device. In some embodiments, sensor device 300 may include a combination of lights, such as an LED array. For example, as shown, sensor device 300 includes an angled face with a grid of lights 322 (e.g., LEDs). This grid may be programmed to display low resolution patterns or provide greater intensity light as a single unit. On another face, sensor device 300 may include a light combined with an input device (e.g., light(s) 322 combined with input 330 on the opposite face of sensor device 300, as shown in FIG. 3B). For example, input 330 may be a physical button that a user may press to interact with sensor device 300. Various depression patterns (e.g., long-press, double-press, triple-press, quick-press) may be used to indicate different input codes. For example, a user may long press the button to initiate pairing with a computing device 120. In another example, a user may tap a code corresponding to a tag that the user wishes to associate with a particular set of data collected. The user may, for example, triple tap input 330 before and/or after performing a motion to indicate that system 100 should flag the corresponding motion profile as an "ideal" or template motion, or a particular motion of interest for further analysis (e.g., bookmarking). While input 330 is shown as a single button, additional buttons and/or touchscreens (not shown) may be placed adjacent to input 330 or on different faces of sensor device 300. In addition to physical buttons, sensor device 300 may include receiver 40 to receive infrared or optical input, for example.

Returning to FIG. 2, in some embodiments, sensor device 200 may include IMU 230 to capture multi-dimensioned acceleration and orientation data. IMU 230 may include magnetometer 332, gyroscope 334, and/or accelerometer 336. In certain embodiments, processor 210 may sample IMU acceleration and orientation data at a rate of 100 samples per second. In some embodiments multiple IMU devices may be "stacked" and then time sliced to permit N Factor sample rate increases such that two such devices can generate 200 samples per second or even more.

In some embodiments, sensor device 200 may include multiple instances of IMU 230 as a redundant measure to filter outlying measurements. For example, processor 210 may receive three-axis acceleration data from two or more IMUs. Processor 210 may average the acceleration data to increase accuracy, or when there are three or more IMUs, processor 210 may not make use of the highest and lowest readings, averaging the remaining readings to reduce measurement inaccuracies.

Sensor device 200 may also include various sensor(s) 240. In some embodiments, sensors may be embedded in sensor device 200 as internal sensor(s) 342. For example, a temperature sensor, light and/or light intensity sensor, humidity sensor, elevation sensor, voltage sensor, pressure sensor, laser sensor, and/or microphone may be housed within sensor device 200 and may interface directly with processor 210. In some embodiments, sensors may interface with sensor device 200 through a port or physical interface as external sensor(s) 344. For example, through a USB or serial connection, sensor device 200 may receive data from off-board sensors, such as biopotential telemetry measurement devices (e.g., electrocardiogram (ECG), electroencephalogram (EEG), electromyogram (EMG) data), optical input devices (e.g., cameras, rangefinders), and/or smartphone sensors (e.g., smartphone GPS, elevation, time, weather, sound, light). In some embodiments, external sensor(s) 344 may be used to verify data from internal sensor(s) 342. In some embodiments, sensor device 200 may be integrated into a larger device or system. For example, sensor device 200 may be part of a machinery monitoring system, vehicle controller system, or any system capable of sensor integration.

Sensor device 200 may include wireless transceiver 250. Transceiver 250 may facilitate communication with computing device 120, network 140, and/or controlled device(s) 150. In some embodiments, transceiver 250 may include Bluetooth® transceiver 352 and/or Wi-Fi transceiver 354. In an example, Bluetooth® transceiver 352 may be a Bluetooth® "classic" transceiver, rather than a Bluetooth® "low energy" transceiver in order to provide increased bandwidth to transmit high resolution sensor data (e.g., to computing device 120) in real-time. In another example, Wi-Fi transceiver 354 may be an IEEE 802.11a/b/g/n/x transceiver.

Additional wired and/or wireless standards may be used consistent with the bandwidth requirements of the disclosed systems and processes.

Sensor device 200 may include power 360 to provide electricity to components, such as processor 210 and storage 215, among other elements. In some embodiments, power 360 may include a direct current power source, such as a battery. For example, power 360 may include a lithium-ion polymer (LiPo) battery, nickel-metal hydride (NiMH) battery, and/or a nickel-cadmium battery. When power 360 includes a battery, power 360 may further include recharging circuitry, such as an electrical port, a removable battery, and/or inductive charging circuitry.

Figure 4:
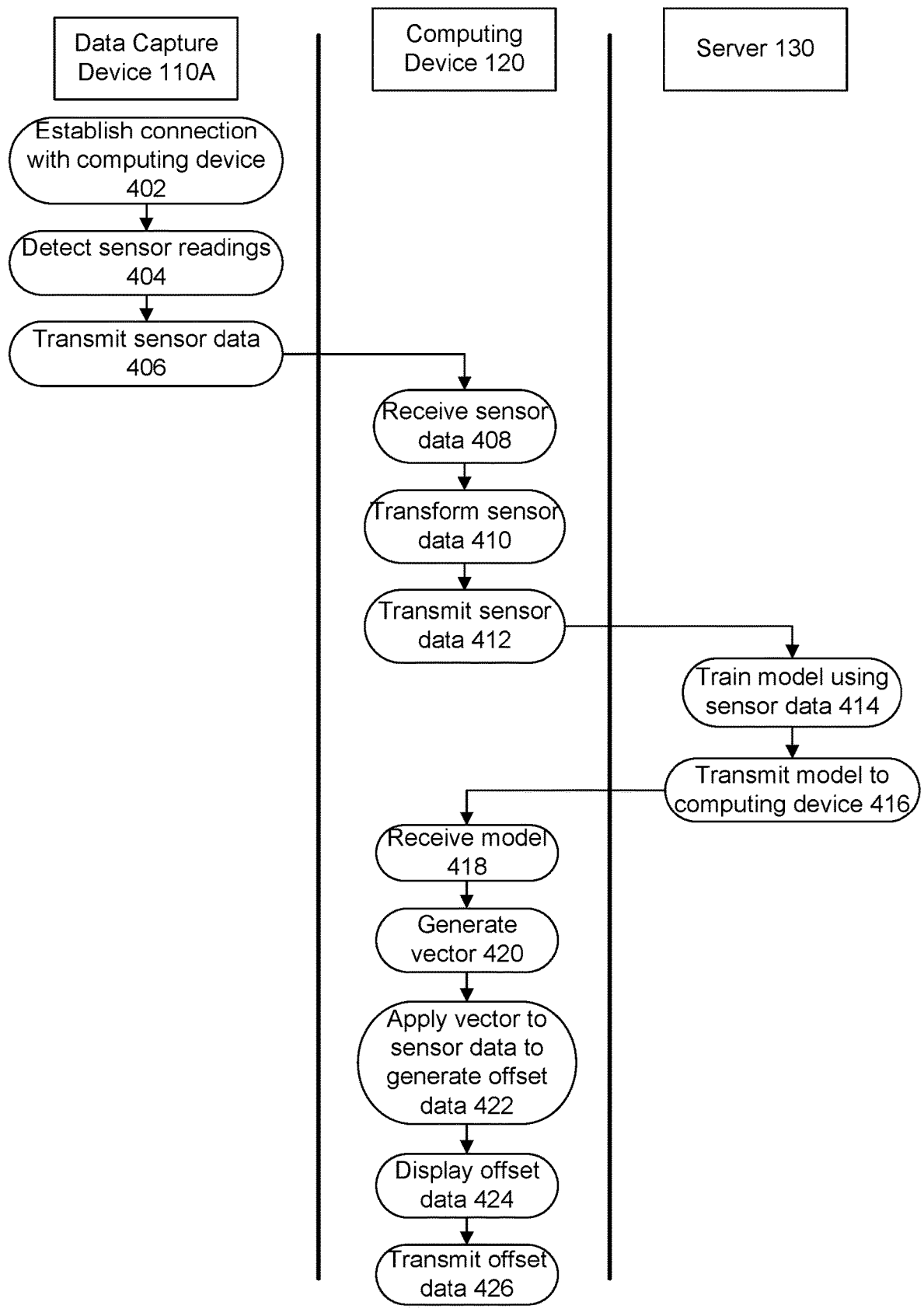
FIG. 4 is a flow diagram illustrating an exemplary data offset creation process in accordance with some embodiments of the present disclosure.

FIG. 4 is a flow diagram illustrating an exemplary data offset creation process in accordance with some embodiments of the present disclosure. Illustrative steps in the following discussion may be described with regard to the actions performed by a particular device, such as data capture device 110A, computing device 120, and/or server 130. However, one or more alternative devices may instead perform the disclosed functions. For example, in an embodiment, a single device (e.g., server 130) may perform operations described with respect to computing device 120 and server 130. Additionally, while the steps in FIG. 4 are shown in a particular order, any of the individual steps may be reordered, omitted, and/or repeated.

In some embodiments, at step 402, data capture device 110A may establish a connection (e.g., a communicative connection) with a computing device, such as computing device 120. In some embodiments, data capture device 110A may establish a connection with a computing device in response to a connection request from the computing device and/or in response to a connection acknowledgement from the computing device.

In some embodiments, at step 404, data capture device 110A may detect sensor readings. A sensor reading may be sensed based on a force or energy impacting the data capture device 110A, such as gravity or electromagnetic waves. For example, data capture device 110A may be an IMU (e.g., IMU 230) that senses gravitational forces and/or changes in gravitational forces (e.g., due to movement of the IMU). As another example, data capture device 110A may be a camera or other visual information capturing device, such as an augmented reality motion capture device, which may detect light, electromagnetic waves, objects, areas, and/or changes thereof. In some embodiments, data capture device 110A may determine or augment (e.g., when position data is determined by IMU data readings) position data based on wireless communications (e.g., global-positioning system, or GPS, data, signal strength readings for a connection with another device).

In some embodiments, at step 406, data capture device 110A may transmit sensor data. For example, data capture device 110A may transmit one or more values associated with motion in one or more coordinate directions (e.g., x, y, and z directions). Additionally, or alternatively, data capture device 110A may transmit one or more images (e.g., images of another data capture device, which may be worn by an individual). In some embodiments data capture device 110A may transmit time series sensor data (e.g., a sequence of motion data values and/or images captured during a particular time period). In some embodiments, data capture device 110A may format sensor data prior to transmitting it, such as formatting sensor data into a format interpretable by a computing device 120. Other aspects of sensor data are discussed further with respect to FIGS. 5 and 6.

In some embodiments, at step 408, computing device 120 may receive sensor data (e.g., the sensor data transmitted by a data capture device at step 406). In some embodiments, computing device 120 may receive additional data related to the sensor data, such as a dataset identifier, transmitting device identifier, metadata, or any other data usable in a process to generate a data offset. Other aspects of sensor data are discussed further with respect to FIGS. 5 and 6.

In some embodiments, at step 410, computing device 120 may transform sensor data. For example, sensor data may be transformed from a raw version of sensor data to a more refined version of sensor data, such as into a format interpretable by a model training application. Other aspects of transforming sensor data are discussed further with respect to FIGS. 5 and 6.

In some embodiments, at step 412, computing device 120 may transmit sensor data, which may or may not have been transformed (e.g., at step 410). In some embodiments, computing device 120 may transmit the sensor data to a server 130, which may be equipped to manage models (e.g., machine-learning models configured to generate offset data). Other aspects of transmitting sensor data are discussed further with respect to FIGS. 5 and 6.

In some embodiments, at step 414, server 130 may train a model using sensor data. For example, server 130 may receive sensor data transmitted by a computing device 120 (e.g., at step 412). In some embodiments, sever 130 may train a model to generate offset data based on input sensor data. Training models, updating models, validating models, model parameters, model configurations, and related aspects are discussed further with respect to FIGS. 5 and 6.

In some embodiments, at step 416, server 130 may transmit a model to a computing device, such as computing device 120 (e.g., a computing device that transmitted sensor data to server 130 at step 412). In some embodiments, server 130 may transmit a model to multiple computing devices, which may or may not include a computing device from which sensor data was received to train the model. Additionally, or alternatively, server 130 may store the model in a storage medium, from which it may accessed, retrieved, and/or transmitted. Other aspects of transmitting a model are discussed further with respect to FIGS. 5 and 6.

In some embodiments, at step 418, computing device 120 may receive a model. In some embodiments, the received model may be a trained model. Additionally, or alternatively, the received model may be tailored to a type of sensor device, type of motion, or other sensor parameter, consistent with disclosed embodiments. Other aspects of transmitting a model are discussed further with respect to FIGS. 5 and 6.

In some embodiments, at step 420, computing device 120 may generate a vector. For example, computing device 120 may generate a vector according to a model, such as by inputting sensor data (e.g., IMU sensor data and motion capture data) into the model. Model parameters, input data, and other aspects related to generation of a vector are discussed further with respect to FIGS. 5 and 6.

In some embodiments, at step 422, computing device 120 may apply the vector to sensor data to generate offset data. For example, computing device 120 may apply the vector to sensor data that was received (e.g., from a sensor device) before the vector was generated. Additionally, or alternatively, computing device 120 may apply the vector to sensor data that was input into the model from which the vector was generated. Other aspects related to application of a vector are discussed further with respect to FIGS. 5 and 6.

In some embodiments, at step 424, computing device 120 may display offset data. For example, computing device 120 may display a visual representation of motion data (e.g., at output device 168) associated with a sensor device (e.g., an IMU). A visual representation may include, for example, be a graph of time-series data. Visual representations and related aspects are discussed further with respect to FIGS. 5 and 6.

In some embodiments, at step 426, computing device 120 may transmit offset data to another device. For example, computing device 120 may transmit offset data to server 130 or another device, which may use the offset to update a model. Additionally, or alternatively, computing device 120 may transmit offset data to another device (e.g., another computing device 120), where it may be displayed. For example, offset data may be displayed at a computing device associated with a medical professional, sports professional, software developer, or any other person who may interpret offset data. Transmitting offset data is discussed further with respect to FIGS. 5 and 6.

Figure 5:
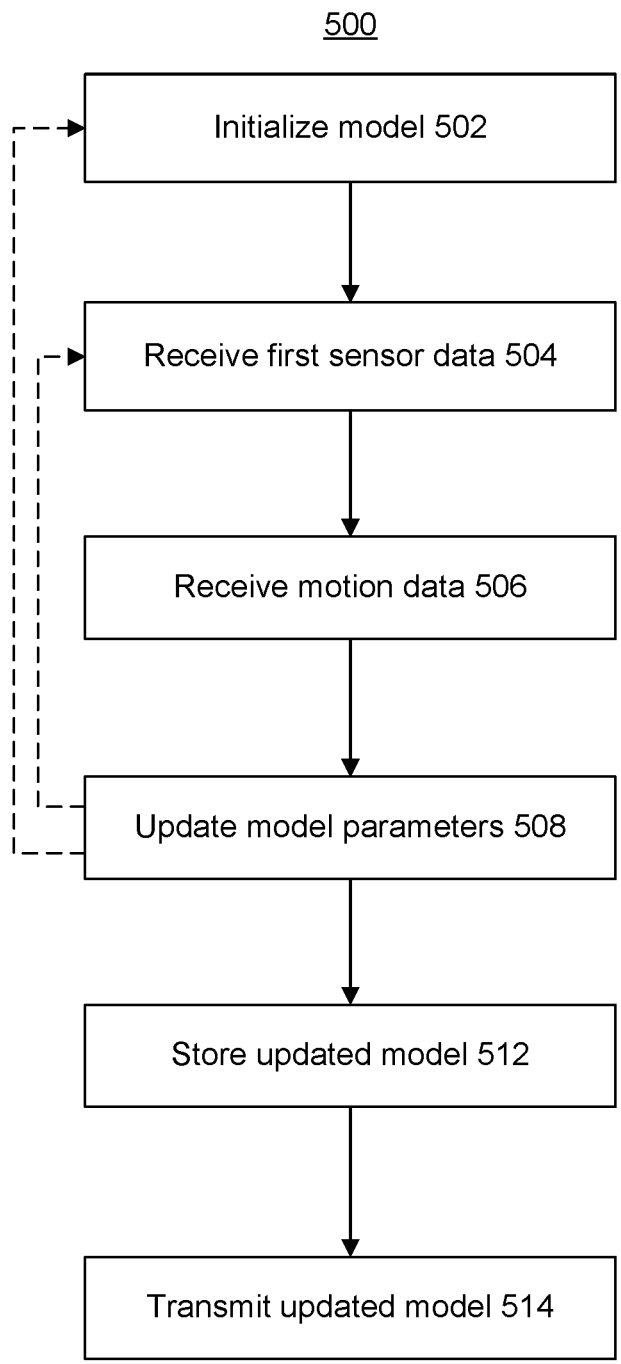
FIG. 5 is a flow diagram illustrating an exemplary data offset model training process in accordance with some embodiments of the present disclosure.

FIG. 5 is a flow diagram illustrating an exemplary data offset model training process 500 in accordance with some embodiments of the present disclosure. Illustrative steps in the following discussion may be described with regard to the actions performed by a particular device, such as server 130. However, one or more alternative devices may instead perform the disclosed functions. For example, in an embodiment, a computing device 120 may perform operations described with respect to FIG. 5. Additionally, while the steps in FIG. 5 are shown in a particular order, the individual steps may be reordered, omitted, and/or repeated. In some embodiments, all or part of process 500 may be performed offline, such as after live data (e.g., motion data, sensor data, camera data) has been recorded and/or transmitted.

At step 502, server 130 may initialize a model, which may be untrained or trained. Initializing a model may include determining a model to retrieve, retrieving a model from a storage medium, setting initial (e.g., default) model parameters (e.g., seed values, a number of neural network layers, types of neural network layers, neural network layer connections). A model may be a machine-learning model, a neural network model (such as an RNN or a CNN), or any other model discussed above with respect to model(s) 178. In some embodiments, a neural network (or other type of model, whether initialized, uninitialized, trained, and/or untrained) may comprise a number of layers, which may perform different functions, and may be computationally (e.g., artificial-neurally) connected to each other through a variety of uni-directional, bi-directional, iterative, recursive, sequential, and other logical connections. For example, a neural network may comprise at least one of: a convolution layer, a linear layer, a soft maximum filter, a drop-out layer (e.g., a layer that may predictably or randomly deactivate neurons in a neural network), a batch normalization layer (e.g., a layer that standardizes data by transforming it to maintain an output close to a certain value and/or with a certain standard deviation and/or close to a more numerically stable or desirable format for machine learning operations), a concatenation layer, or a one-dimensional layer. A layer or combination of layers may improve machine learning models and/or outputs, such as in sensor data or motion data contexts. For example, a drop-out layer may cause the deactivation of neurons (e.g., deactivating neurons that may or may not be determining correct motion or sensor values), which may effectively force the network to distribute the knowledge uniformly across the whole layer, which may lead to improved model accuracy and/or an ability of a model to generalize better. As another example, a batch normalization layer may help address model errors, such as by reducing the risk of convergence of training data to a local minimum that results in a less accurate model. Some embodiments may include a one-dimensional (1-D) layer, which may include a neural network layer that interprets and/or applies at least one data operation to data representing positional or movement data (e.g., data representing angular momentum or angular velocity). In some embodiments, one or more vectors may be concatenated into a 1D layer.

In some embodiments, one layer may be connected to (e.g., configured to send output to) another layer. As an example, a neural network may include a 1-D layer that may be connected to a convolution layer. As another example, a neural network may include a convolution layer that is connected to a linear layer. In some embodiments, layers of a model may be connected in a linear or serial fashion. In other embodiments, layers of a model may be interconnected in a nonlinear fashion. In some embodiments, a model, such as a neural network, may have a number of kernels, which may be part of a layer. For example, a neural network may have a layer that has one or more kernels, which may include a function, a polynomial, a classifier (e.g., a linear or nonlinear classifier).

In some embodiments, server 130 may select the model (e.g., a machine learning model) from among a plurality of models associated with one or more respective contextual attributes, such as respective data capture device types, respective motion types, respective sensor placements (e.g., a sensor placement relative to an individual's body), respective sources of motion (e.g., a particular machine), respective environment conditions, respective user identifiers, respective user attributes (e.g., an age of a user, a height of a user, a weight of a user, a sex of a user, a body mass index of a user, a physical fitness rating of a user), or any combination thereof. For example, a model may be trained (e.g., a form of being associated with) according to data that was sourced from a particular motion type (e.g., arm rotation), but was not sourced according to a particular environment condition (e.g., a data capturing camera placed a particular distance away from an individual moving with an IMU). In some embodiments, server 130 may select the model (e.g., a machine learning model) from among the plurality of models based on at least one input at a computer-implemented device (e.g., a user input indicating a motion type, motion source, sensor placement, environment condition, or identification of a specific model). The input may be received from a user (e.g., through a touch at a touchscreen, a mouse click, or a keyboard press). For example, server 130 may select a model that has at least one model parameter corresponding to at least one input received at the computing device.

In some embodiments, server 130 may receive sensor data and/or motion data in a raw form and/or a refined form. For example, server 130 may receive raw sensor data to which at least one data transformation has been applied (e.g., according to step 606, discussed below), which may refine the data. Additionally, or alternatively, server 130 may apply one or more data transformations to received sensor data and/or motion data, such as any data transformation described below (e.g., with respect to step 606).

In some embodiments, server 130 may receive, access, and/or generate model input data, which may be input data for training a model, such as training a model to generate at least one vector. Receiving, accessing, and/or generating model input data may be part of initializing, training, or using a model. The generation may be based on one or more sensor data values (e.g., at least one stream of time-series representing motion of a motion device). Model input data may comprise at least one of: a value representing absolute orientation in space, a value representing a measurement of a gravitational force, a value representing angular velocity, a vector representing one or more angular velocities, a value representing linear acceleration, a vector representing one or more linear accelerations, a matrix representing one or more angular velocities, a matrix representing one or more linear accelerations, or any other combination of values (including vectors and matrices) representing at least one angular velocity, linear acceleration, absolute orientation in space, or measurement of gravitational force. For example, model input data may comprise a time-series sequence of triaxial values (e.g., a data stream) representing angular velocity and/or linear acceleration of a device (e.g., a sensor device 200, a data capture device 110A). In some embodiments, model input data may include a combination of data points from a data stream, which may be formed into a matrix, which may have matrix dimensions of approximately 600× 300 values (e.g., values of linear acceleration, values of angular momentum, pixel values, velocity values, position values), though of course other matrix dimensions are contemplated.

As discussed further herein, model input data (which may include, or have been derived from, sensor data and/or motion data) may be associated with one or more contextual attributes. As discussed above, a contextual attribute may include a data capture device type, a motion type, a sensor placement, an environment condition, a user identifier, a user attribute (e.g., an age of a user, a height of a user, a weight of a user, a sex of a user, a body mass index of a user, a physical fitness rating of a user), or any combination thereof.

At step 504, server 130 may receive first sensor data, which may be received from at least one motion sensor. Sensor data may include a signal, a value, or a set of values (e.g., a vector, matrix, or data stream) sensed by a motion sensor based on detections of gravitational and/or electromagnetic forces by the sensor device. For example, a motion sensor, such as an IMU (e.g., IMU 230), may measure an acceleration, velocity, direction, absolute position, relative position, and/or specific force, and may convey these measurements to a computing device. In some embodiments, sensor data (e.g., first sensor data and/or second sensor data) may include a time series dataset (e.g., a time series of vectors). In some embodiments, sensor data may be measured along one, two, three, or more axes. For example, sensor data may include a data stream of time-series sensor data, which may be from a motion sensor, and which may include triaxial (e.g., x-y-z) values. In some embodiments, a data stream may have a data speed of 100 data points per second, though of course, faster and slower speeds are contemplated. In some embodiments, IMU measurements may be expressed relative to a particular calibration, such as when the IMU is "zeroed," which may occur while the IMU is stationary. In some embodiments, the first sensor data may comprise position data of the IMU, which may be expressed relative to a coordinate system and/or a particular position (e.g., a starting position of the IMU). In some embodiments, first sensor data may include a value, vector, or other data representing angular velocity and/or linear acceleration (e.g., of the at least one motion sensor). In some embodiments, computing device 120 may also receive data associated with sensor data (e.g., metadata), such as a session identifier, a device (e.g., sensor device, motion capture device, such as a camera) identifier, a timestamp, an environment condition, other user input (as discussed above with respect to model 178), a contextual attribute, or any other data describing how or when sensor data was captured. A motion sensor may include an IMU, accelerometer, gyroscope, magnetometer, or any other device configured to sense gravitational or electromagnetic forces (e.g., data capture device 110B). Receiving first sensor data from at least one motion sensor may include receiving the first sensor data directly or indirectly from the at least one motion sensor. For example, the at least one motion sensor may transmit the sensor data to a computing device 120, which in turn may transmit the sensor data to server 130 (e.g., across a network). In some embodiments, computing device 120 may perform certain data refinement operations to sensor data before transmitting it to server 130, discussed further below.

First sensor data may be sensor data that is received from a first sensor device during a first time period. A first time period may be any amount of time, such as a few milliseconds. In some embodiments, a first time period may be associated with a training period and/or a data gathering session (e.g., for motion analysis and/or sensor data correction). Additionally, or alternatively, a first time period may simply be a portion of a time during which a first sensor device is used (e.g., followed by a second time period).

At step 506, server 130 may receive motion data, which may be three dimensional (3-D) motion data based on motion detected by at least one camera. Motion data may include at least one image, a sequence of images, a value (e.g., positional value, coordinate value, angular momentum value, velocity value, directional value), vector, shape, model, data derived from at least one image (e.g., a value related to a position or movement of an object), any other representation of an object or motion of an object through space, or any combination thereof. For example, a computing device 120 may detect movement of an object (e.g., an arm, a leg, a neck, a joint, a torso, a head, or other body part of a person) within a sequence of images, such as through edge detection and/or changes in pixel values between images. Computing device 120 may detect movement of the object by analyzing images of the object (e.g., a third-person view) and/or by analyzing images captured by a device attached to the object (e.g., a wearable image sensor worn by an individual). In some embodiments, computing device 120 may derive additional information (e.g., from camera images), such as one or more values representing angular velocity and/or linear acceleration (e.g., of a moving object). In some embodiments, motion data may include a data stream of time-series motion data, such as 3-dimensional (3-D) motion data, which may be based on motion detected by at least one camera (or other electromagnetic wave-sensing device). As mentioned above, in some embodiments, a data stream may have a data speed of 100 data points per second, though of course, faster and slower speeds are contemplated.

In some embodiments, the at least one camera may be integrated into a computing device 120 or may be separate. For example, the at least one camera may be part of an augmented reality (AR) device (e.g., device configured to generate AR data related to a physical environment). In some embodiments, motion data may be captured and/or derived using an augmented reality framework kit, such as ARKit. In some embodiments, server 130 may receive motion data from a plurality of cameras (e.g., an array of cameras positions throughout a room). An image may be detected by a camera in any spectrum or spectra of light (e.g., visible light waves, infrared waves, ultraviolet waves, radio waves). Additionally, or alternatively to receiving motion data captured by a camera, server 130 may receive motion data captured by another device, such a radio beacon, WiFi beacon, or Light Detection and Ranging (LiDAR) device.

In some embodiments, the first sensor data and/or the motion data (e.g., 3-D motion data) may be generated while a computer-implemented device and/or the at least one motion sensor are in contact with a user or object. For example, a sensor device (e.g., an IMU) may be attached to a user, such as through a band worn by the user (e.g., around a user's waist, arm, leg, ankle, wrist, neck, head, or any other body part) that is attached to the sensor device, and may measure data, consistent with disclosed embodiments, while worn. As another example, a camera, which may be part of a computing device, may be attached to a band, which may be worn by a user around a body part. In some embodiments, a sensor device and a camera (or other motion capture device) may be in contact with (e.g., worn by) a user at the same or at different body parts. In some embodiments, a sensor device (e.g., an IMU) and a motion capture device (e.g., a camera) may be included in a single portable electronic device, which may be configured to be worn by a user (e.g., may have an attached band, necklace, adhesive surface, or magnet). Additionally, or alternatively, a sensor device (e.g., IMU, camera) may be in contact with (e.g., attached to or integrated with) a non-human object (e.g., a machine), and may measure data (e.g., sensor data, motion data) associated with the non-human object.

At step 508, server 130 may update model parameters, such as according to a model training procedure. Updating model parameters may include removing a neural network layer, adding a neural network layer, duplicating a neural network layer, re-positioning a neural network layer within a model, adding a connection between neural network layers, removing a connection between neural network layers, changing a value associated with a neural network layer (e.g., changing a number of times one or more layers are iterated), or making any change to a value or structure of a model that causes the model to change its behavior. In some embodiments, server 130 may update model parameters of a model multiple times, such as in response to intermediate model outputs (e.g., training outputs) and/or in response to multiple datasets received from one or more devices (e.g., multiple computing devices 120). In some embodiments, server 130 may cease to update model parameters when server 130 determines that a training criterion is satisfied. For example, server 130 may determine that a model produces outputs within a threshold standard deviation, or within a threshold difference of an expected value (e.g., a percentage-based difference, an absolute value-based difference), and in response may cease to update model parameters, at which point the model may be considered trained. In some embodiments, server 130 may train a machine learning model using the received first sensor data and the received 3-D motion data. For example, server 130 may input model input data (which may be based on sensor data and/or motion data, consistent with disclosed embodiments) to a model, which may produce an intermediate output and/or final output, such as by manipulating the received data according to a plurality of neural network layers, consistent with disclosed embodiments. Server 130 may adjust at least one model parameter based on the intermediate output, which may influence another intermediate output and/or final output of the model.

In some embodiments, a model (e.g., neural network) may use motion data (e.g., 3-D motion data) as sample data for training. For example, a model (trained or untrained) may treat motion data as expected sensor data, and may determine (e.g., according to its configuration of neural network layers) one or more operations (e.g., data manipulations) to reliably cause sensor data to resemble motion data. In some embodiments, a model may be trained (e.g., through updating of model parameters) to output (e.g., predict) an offset for sensor data. An offset for sensor data may include one or more values, vectors, matrices, algorithms, or any other digital information usable to correct values of sensor data (e.g., to mitigate drift, improve location measurement, etc.). For example, an offset may include at least one vector, and the at least one vector may comprise at least two values (e.g., two values corresponding to two different coordinate axes or directions). In some embodiments, one or more values of the at least one vector (e.g., each value) may correspond to a different coordinate axis or direction (e.g., according to a coordinate system, such as an x-y-z coordinate system). In some embodiments, a computing device 120 may update a model parameter (e.g., of a locally or remotely stored model), instead of, or in addition to, server 130. In some embodiments, computing device 120 may receive additional sensor data or motion data after updating a model parameter (as indicated by the dashed lines), and may perform additional updates to one or more model parameters based on the additional received data.

In some embodiments, server 130 may train a model (e.g., a machine learning model) to generate at least one vector (or other output). In some embodiments, the training may be based on model input data sourced with at least one particular contextual attribute. A contextual attribute may include at least one of: a particular type of data capturing device (e.g., an IMU, an accelerometer, a camera, a radio beacon, or any other sensor device or motion capture device discussed above), a particular motion type, a particular sensor placement, a particular user identifier, a particular environment condition, any other contextual attribute discussed herein. For example, the training of the model may be based on model input data that was sourced by an IMU (e.g., a particular type of data capturing device) worn on a user's ankle (e.g., a particular sensor placement) for walking gait analysis (e.g., a particular motion type), in a small indoor room with little to no sensor interference (e.g., a particular environment condition). In some embodiments, model input data may be associated with a particular user identifier (e.g., a person's name, patient identifier), which may allow for training a model particularized to idiosyncrasies of an individual. Additionally, or alternatively, the trained model may be configured to generate at least one vector, and the generation may be based on model input data sourced with at least one of: a particular type of data capturing device, a particular motion type, a particular sensor placement, respective user identifier, or a particular environment condition.

At step 512, sever 130 may store an updated model (e.g., a model having at least one parameter updated at step 510). For example, sever 130 may store the updated model in a database. In some embodiments, server 130 may associate (e.g., using a data structure) a model with metadata, which may indicate information associated with model input data that was used to train the model (e.g., a particular type of data capturing device, a particular motion type, a particular sensor placement, a particular environment condition, a user associated with model input data, a time at which the model was trained, or any contextual attribute).

At step 514, server 130 may transmit the updated model, such as to one or more computing devices 120N. For example, server 130 may transmit the updated model to computing device 120A in response to a request from computing device 120A, which may include specific request parameters corresponding to model parameters. In some embodiments, server 130 may determine a model to transmit based on request parameters included in a request from a computing device. For example, server 130 may identify request parameters identifying a sensor placement at a wrist and a rotation motion analysis, and may, in response, retrieve and/or transmit a model having parameters including a sensor placement at a wrist and a rotation motion analysis (e.g., a model that was trained with model input data sourced with a sensor placement at a wrist and a rotational type of motion). Additionally, or alternatively, server 130 may transmit the updated model automatically to a computing device, without receiving a request from the computing device.

Figure 6:
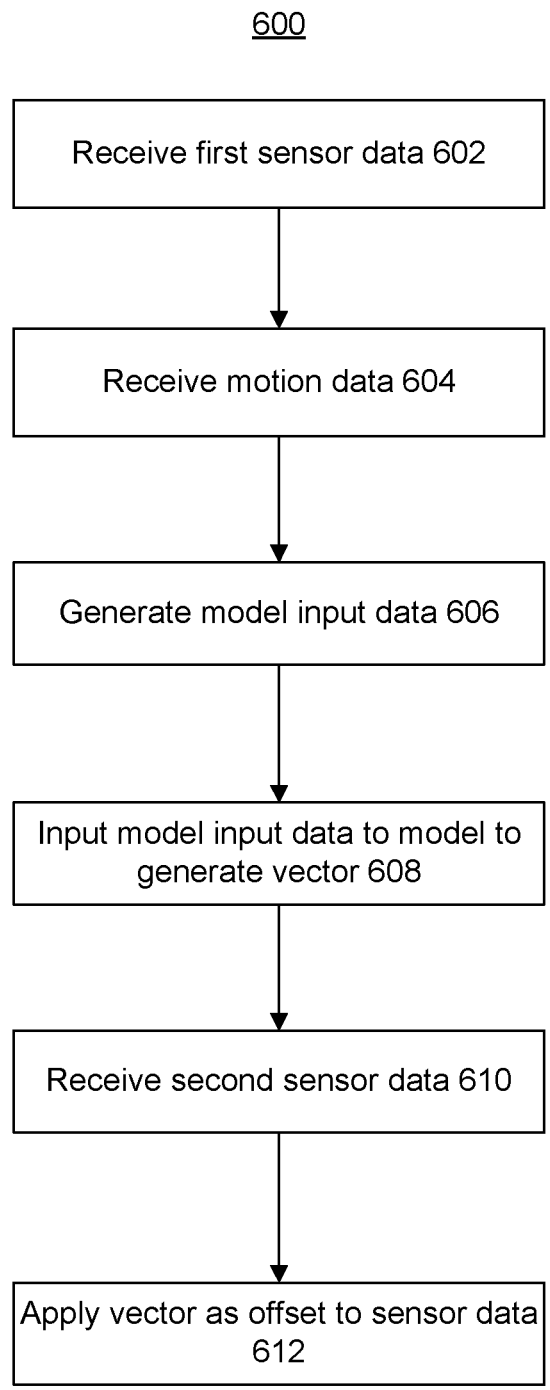
FIG. 6 is a flow diagram illustrating an exemplary data offset process in accordance with some embodiments of the present disclosure.

FIG. 6 is a flow diagram illustrating an exemplary data offset process 600 in accordance with some embodiments of the present disclosure. Process 600 may involve the application of a trained model to input data. Illustrative steps in the following discussion may be described with regard to the actions performed by a particular device, such as computing device 120. However, one or more alternative devices may instead perform the disclosed functions. For example, in an embodiment, a server 130 may perform operations described with respect to FIG. 6. Additionally, while the steps in FIG. 6 are shown in a particular order, the individual steps may be reordered, omitted, and/or repeated. Moreover, any computing device (e.g., having at least one processor) may carry out any combination of steps from process 500 and process 600.

At step 602, computing device 120 may receive first sensor data. First sensor data may include any aspect of sensor data described above with respect to FIG. 5. For example, first sensor data may include one or more sensor readings (e.g., raw or refined, as discussed above), which computing device 120 may receive from at least one motion sensor, such as an IMU (e.g., IMU 230). In some embodiments, motion sensor may be communicably coupled to a computer-implemented device (e.g., a computing device 120 implementing process 600), such as through a wired or wireless connection. By way of further example, computing device 120 may receive first sensor data across a Bluetooth® connection (e.g., between computing device 120 and data capture device 110A). Of course, any communication connection, such as those discussed above with respect to network 140. As mentioned above, first sensor data may be received (e.g., by computing device 120) as a data stream, which may have a data speed of 100 data points per second, though of course, faster and slower speeds are contemplated.

As discussed above, first sensor data may have been captured during, or otherwise associated with, a first time period. For example, first sensor data may have been captured during a portion of a data gathering and/or motion analysis session.

At step 604, computing device 120 may receive motion data (e.g., AR data associated with visual motion), which may be received from at least one camera. Motion data may include any aspect of motion data described above with respect to FIG. 5. For example, computing device 120 may receive motion data including 3-D motion data based on motion (e.g., motion of an individual) detected by at least one camera. In some embodiments, computing device 120, or any other device performing a portion of process 600, may comprise the at least one camera. For instance, computing device 120 may include at least one camera, which may capture motion data, and at least one processor, which may perform one or more steps of process 600. As mentioned above, motion data may be received (e.g., by computing device 120) as a data stream, which may have a data speed of 100 data points per second, though of course, faster and slower speeds are contemplated.

At step 606, computing device 120 may generate model input data. In some embodiments, model input data may be based on the received first sensor data and/or the received 3-D motion data (e.g., received at steps 602 and 604). Model input data may include any aspect of model input data described above with respect to FIG. 5. For example, model input data may include a combination of data points from a data stream, which may be formed into a matrix. In some embodiments, model input data may be sensor data, motion data, refined data (e.g., refined sensor or motion data), or any combination thereof. In some embodiments, the model input data may comprise at least one of: a value representing absolute orientation in space, a value representing a measurement of a gravitational force, a value representing angular velocity, a vector representing one or more angular velocities, a value representing linear acceleration, a vector representing one or more linear accelerations, a matrix representing one or more angular velocities, a matrix representing one or more linear accelerations, or any other combination of values representing at least one angular velocity or linear acceleration. In some embodiments, the model input data may include vectors that are based on one or more data streams (e.g., a data stream of the first sensor data and a data stream of the motion data). In some embodiments, computing device 120 may receive model input data from a device (e.g., a sensor device, a camera), or may be compute model input data locally. For example, computing device 120 may compute a value representing angular velocity or a value representing linear acceleration based on sequences of coordinate values (e.g., values of force in a coordinate direction) received from a sensor device. As another example, computing device 120 may compute a value representing a gravitational force based on one or more values received from a sensor device (e.g., sensed by an accelerometer, sensed by a gravity sensor, etc.).

Refined data may include sensor data, motion data, or any data received from a data capture device that has been changed in some way by computing device 120. For example, computing device 120 may apply a data transformation to the received first sensor data and/or received motion data to generate at least a portion of the model input data. The data transformation may include at least one of: a data smoothing operation (e.g., exponential smoothing, random value removal, outlier value removal), a moving average operation, a coordinate frame transformation, an operation to express data based on an orientation of a sensor device (e.g., aligning positional data to a coordinate frame of a sensor device), a statistical or any other change to sensor or motion data to change it into a format interpretable and/or usable by a model (e.g., for training and/or outputting of an offset value). For example, one or more values (e.g., velocity values) may be integrated over a window of time to determine displacement of the window of time. Additionally, or alternatively, motion data (e.g., 3-D positional data) may be aligned with a sensor's coordinate frame, which may then be converted into linear velocities or other values. As another example, a data transformation may include converting 3-D motion data from a format of an AR application to a format understandable by a model, such as by converting image data to vectors corresponding to motion. A data transformation may be beneficial by transforming data into a format that a model may use to produce an output, where other formats may not be understandable by the model. Moreover, in some embodiments, performing these operations at a computing device 120 rather than at server 130, which may serve a large number of computing devices, may balance computational loads placed upon computing devices and one or more servers. Further, a computing device 120 may be better suited to performing data transformations as it may have better access to a data stream (e.g., for computing a moving average). Having a data transformation performed by a computing device prior to transmitting any data to a remote device may thus reduce strain on network bandwidth or other resources.

At step 608, computing device 120 may input the model input data into a model (e.g., a machine learning model) to generate at least one vector. A model may include any model discussed above with respect to FIG. 5. For example, a model may include a machine learning model, such as a neural network. In some embodiments, inputting the model input data into the model may include transmitting the model input data (e.g., to a server hosting the model), requesting a model (e.g., to be sent from a sever), and/or accessing a model (e.g., from a remote server, locally at computing device 120). For example, computing device 120 may transmit the model input data to a remote server, which may generate a model output, such as by inputting the received model input data to the model to generate the output (e.g., a vector). As another example, computing device 120 may retrieve a model (e.g., from remote or local storage), and may locally generate a model output, such as by inputting the received model input data to the model to generate the output. As discussed above, an output generated using the model may include at least one vector, which may include values for multiple coordinate axes (e.g., x, y, and z). In some embodiments, such as where computing device 120 locally inputs the model input data to a model, computing device 120 may select the model (e.g., a machine learning model) from among a plurality of models. The plurality of models may be associated with one or more respective contextual attributes (discussed above). In some embodiments, computing device 120 may select the model based on at least one input received at a computer-implemented device (e.g., at computing device 120) from a user, as discussed above with respect to server 130. Of course, server 130 may also select the model, as discussed above.

At step 610, computing device 120 may receive second sensor data, which may include any aspect discussed above with respect to first sensor data. In some embodiments, second sensor data may be sensor data that is received from a sensor device during a second time period. In some embodiments, the second time period may occur after the first time period, discussed above. For example, the second time period may occur immediately after the first time period, within several seconds after the first time period, or at any other time after the first time period (e.g., during a separate motion analysis session). As with the first time period, the second time period may be any amount of time, such as a few milliseconds. A second time period may also be associated with a training period and/or a data gathering session. For example, the second time period may be associated with a same training period or data gathering session as the first time period.

At step 612, computing device 120 may apply the at least one vector as an offset to sensor data. For example, computing device 120 may apply the at least one vector as an offset to at least one of: the received first sensor data, to create offset first sensor data; or second sensor data received from the at least one motion sensor, to create offset second sensor data. Thus, the at least one vector may be applied to past or recorded data (e.g., data used to generate the at least one vector) and/or applied to data received in real time (e.g., second sensor data). Applying the at least one vector to sensor data may include adding and/or subtracting values from the sensor data. For example, the at least one vector may be added to any or all of a stream of values (e.g., sensor values generated by a motion sensor, such as an IMU). In some embodiments, computing device 120 may apply at least one vector as an offset to at least one of data stream (e.g., a data stream of the sensor data and/or a data stream of motion data). In some embodiments, computing device 120 may apply the at least one vector as an offset to the received first sensor data, to create offset first sensor data. The offset first sensor data may be stored, displayed, aggregated with second offset data, and/or used for training or validation of a model (e.g., by server 130). In some embodiments, server 130 may apply the at least one vector as an offset to the first sensor data (e.g., received from the computing device 120) to generate the offset first sensor data.

In some embodiments, computing device 120 may apply the at least one vector as an offset to the received second sensor data, to create offset second sensor data. The offset second sensor data may be stored, displayed, aggregated with first offset data, and/or used for training or validation of a model (e.g., by server 130). In some embodiments, server 130 may apply the at least one vector as an offset to the second sensor data (e.g., received from the computing device 120) to generate the offset second sensor data. In some embodiments, computing device 120 may apply the at least one vector as an offset to second sensor data as it is received in real time, which may allow for rapid correction of drift in sensor values, improving accuracy of sensor readings and motion-representation data. These corrections may be integrated into stored and/or displayed motion data, allowing for more accurate depiction and understanding of motion data (e.g., to diagnose a medical condition, to formulate recommendations for physical activity).

In some embodiments, computing device 120 may display a visual representation of time series data, such as data representing motion of a sensor device (e.g., an IMU). For example, computing device 120 may cause a display (e.g., an output device 168) to present a graph (e.g., a line graph), chart, animation, 2-D rendering, 3-D rendering, or other visual depiction of sensor device's position, movement, velocity, acceleration, or combination thereof, over time. In some embodiments, computing device may cause the display of a visual representation of time series data with and/or without a data offset. For example, computing device 120 may use at least one of the offset first sensor data or the offset second sensor data to adjust a visual representation of a time series datasets (e.g., a time series dataset of the first and/or second sensor data). Computing device 120 may also cause the display of the adjusted visual representation. Additionally, or alternatively, computing device 120 may cause the display of a visual depiction showing a difference between non-offset sensor data and offset sensor data (e.g., showing a line graph of the different, showing a dual-line graph having respective lines depicting the non-offset sensor data and the offset sensor data). Of course, as with any aspect of process 600, a visual representation may be adjusted at a device other than computing device 120. For example, a computing device 120 or a server 130 may cause the display of the adjusted visual representation at a separate device.

In some embodiments, computing device 120 may provide one or more recommendations based on offset sensor data, which may be more accurate than non-offset sensor data. For example, computing device 120 may compare offset time series data representing motion to reference data (e.g., series of motion-related values, graph of motion, vectors representing motion) associated with one or more recommendations, and may provide the one or more recommendations (e.g., cause a recommendation to be displayed at computing device 120). For example, computing device 120 may determine that offset time series data is within a threshold similarity of a pattern of motion corresponding to lack of full expected motion (e.g., for a leg, arm, wrist, or other body part), and may provide a recommendation to perform an activity (e.g., physical therapy, an exercise, a practice technique) to reach a better motion pattern (e.g., for medical or sports performance reasons). Additionally, or alternatively, server 130 may analyze motion data and provide (e.g., transmit) an associated recommendation to a computing device.

As indicated above, steps of process 600 may be repeated, such that successive instances of sensor and/or motion data are received and input into a model to produce updated vector values (e.g., each updated value being based on each successive instance of data). For example, a vector may be generated by a model (e.g., an updated vector, different from an earlier generated vector) based on data from a third time period, and may be applied to sensor data from a fourth time period. Of course, any number of time periods and sequencing of steps of process 600 are contemplated, such that an offset (e.g., a vector) for sensor data may be repeatedly generated and applied to received sensor data, to allow for improved accuracy of sensor data (e.g., IMU data) in real time.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

For example, while some embodiments are discussed in a context involving human motion, the techniques described herein may also be applied to animal motion, machine motion, or motion performed by other actors. Moreover, while contexts relating to individual health or fitness are mentioned, the techniques described herein may also be applied to contexts involving individual productivity (e.g., monitoring motions of a factory line worker, a motion of a mover lifting boxes, etc.), individual driving habits, or any context of analyzing motion based on sensor data.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented device for mitigating measurement drift and improving inertial measurement unit (IMU) odometry measurement, the device comprising:
    a memory storing instructions; and
    at least one processor configured to execute the instructions to:
        receive first sensor data from at least one motion sensor;
        receive 3-D motion data based on motion detected by at least one camera;
        input model input data into a machine learning model configured to generate at least one vector, the model input data being based on the received first sensor data and the received 3-D motion data; and
        apply the at least one vector as an offset to at least one of:
            the received first sensor data, to create offset first sensor data; or
            second sensor data received from the at least one motion sensor, to create offset second sensor data.

2. The computer-implemented device of claim 1, wherein the model input data comprises at least one of:
    a value representing absolute orientation in space;
    a value representing a measurement of a gravitational force;
    a value representing angular velocity; or
    a value representing linear acceleration.

3. The computer-implemented device of claim 1, wherein the machine learning model is a neural network.

4. The computer-implemented device of claim 3, wherein the neural network comprises at least one of:
    a convolution layer;
    a linear layer;
    a soft maximum filter;
    a drop-out layer; or
    a batch normalization layer.

5. The computer-implemented device of claim 3, wherein the neural network comprises a one-dimensional layer.

6. The computer-implemented device of claim 1, wherein the at least one vector comprises at least two values, each value corresponding to a different coordinate direction.

7. The computer-implemented device of claim 1, wherein:
    the at least one motion sensor comprises an inertial measurement unit (IMU); and
    the received first sensor data comprises position data of the IMU.

8. The computer-implemented device of claim 1, wherein the device comprises the at least one camera.

9. The computer-implemented device of claim 1, wherein:
    the at least one motion sensor comprises an inertial measurement unit (IMU); and
    the IMU is communicably coupled to the computer-implemented device.

10. The computer-implemented device of claim 1, wherein the first sensor data and the 3-D motion data are generated while the at least one motion sensor or the at least one camera is in contact with a user.

11. The computer-implemented device of claim 1, wherein the at least one processor is configured to execute an instruction to apply a data transformation to the received first sensor data to generate at least a portion of the model input data.

12. The computer-implemented device of claim 11, wherein the data transformation comprises at least one of:
    a data smoothing operation;
    a moving average operation; or
    a coordinate frame transformation.

13. The computer-implemented device of claim 1, wherein:
    the first sensor data and the second sensor data comprise time series datasets; and
    the at least one processor is configured to execute an instruction to use at least one of the offset first sensor data or the offset second sensor data to adjust a visual representation of one of the time series datasets.

14. The computer-implemented device of claim 13, wherein the at least one processor is configured to execute an instruction to cause displaying of the adjusted visual representation.

15. The computer-implemented device of claim 1, wherein the machine learning model is trained to generate the at least one vector, the training being based on model input data sourced with at least one particular contextual attribute.

16. The computer-implemented device of claim 15, wherein the at least one processor is configured to execute an instruction to select the machine learning model from among a plurality of machine learning models associated with respective contextual attributes.

17. The computer-implemented device of claim 16, wherein the at least one processor is configured to execute an instruction to select the machine learning model based on at least one input received at the computer-implemented device from a user.

18. The computer-implemented device of claim 1, wherein the at least one processor is configured to execute an instruction to train the machine learning model using the received first sensor data and the received 3-D motion data.

19. A method for mitigating measurement drift and improving IMU odometry measurement, comprising:
   receiving first sensor data from at least one motion sensor;
   receiving 3-D motion data based on motion detected by at least one camera;
   inputting model input data into a machine learning model configured to generate at least one vector, the model input data being based on the received first sensor data and the received 3-D motion data; and
   applying the at least one vector as an offset to at least one of:
      the received first sensor data, to create offset first sensor data; or
      second sensor data received from the at least one motion sensor, to create offset second sensor data.

20. A computer-implemented device for mitigating measurement drift and improving IMU odometry measurement, the device comprising:
   a memory storing instructions; and
   at least one processor configured to execute the instructions to:
      receive a first data stream of time-series sensor data from at least one motion sensor;
      receive a second data stream of time-series 3-D motion data based on motion detected by at least one camera;
      input model input data into a machine learning model configured to generate at least one vector, the model input data comprising vectors representing at least one of angular velocity or linear acceleration, the vectors being based on the first data stream and the second data stream; and
      apply the at least one vector as an offset to at least one of the first data stream or the second data stream.

* * * * *